US00RE43410E

(19) United States
(12) Reissued Patent
Goode

(10) Patent Number: US RE43,410 E
(45) Date of Reissued Patent: May 29, 2012

(54) UNIVERSAL CARRIER FOR GRIPPERS IN A COILED TUBING INJECTOR

(75) Inventor: John E. Goode, Arlington, TX (US)

(73) Assignee: Varco I/P, Inc., Houston, TX (US)

(21) Appl. No.: 10/345,836

(22) Filed: Jan. 16, 2003

Related U.S. Patent Documents

Reissue of:
(64) Patent No.: 6,173,769
Issued: Jan. 16, 2001
Appl. No.: 09/070,593
Filed: Apr. 30, 1998

U.S. Applications:
(60) Provisional application No. 60/045,365, filed on May 2, 1997.

(51) Int. Cl.
*E21B 19/22* (2006.01)

(52) U.S. Cl. ..... 166/77.3; 226/173; 403/353

(58) Field of Classification Search ..... 166/77.1, 166/77.2, 77.3, 77.51, 85.5, 240; 294/86.1; 226/173, 172; 403/353, 319
See application file for complete search history.

(56) References Cited

U.S. PATENT DOCUMENTS

| | | | | |
|---|---|---|---|---|
| 2,126,933 | A | | 8/1938 | Stone et al. |
| 2,567,009 | A | | 9/1951 | Calhoun et al. |
| 2,681,793 | A | | 6/1954 | Miller |
| 3,182,877 | A | | 5/1965 | Slator et al. |
| 3,216,639 | A | | 11/1965 | Castella |
| 3,285,485 | A | | 11/1966 | Slator |
| 3,322,472 | A | * | 5/1967 | Ley ..... 305/164 |
| 3,373,818 | A | | 3/1968 | Rike et al. |
| 3,401,749 | A | | 9/1968 | Daniel |
| 3,559,905 | A | | 2/1971 | Palynchuk |
| 3,618,840 | A | | 11/1971 | Courret |
| 3,638,288 | A | | 2/1972 | Pryor |
| 3,667,554 | A | | 6/1972 | Smitherman |
| 3,690,136 | A | | 9/1972 | Slator et al. |
| 3,724,567 | A | | 4/1973 | Smitherman |
| 3,754,474 | A | * | 8/1973 | Palynchuk ..... 74/162 |
| 3,778,094 | A | | 12/1973 | Grolet et al. |
| 3,822,559 | A | | 7/1974 | Mathews, Jr. et al. |

(Continued)

FOREIGN PATENT DOCUMENTS

CA 953644 8/1974

(Continued)

OTHER PUBLICATIONS

Search Report Under Section 17(5); Application No. GB 9809416.2; U.K. Patent Office; Sep. 30, 1998; 2 pgs.

(Continued)

*Primary Examiner* — Zakiya W Bates
(74) *Attorney, Agent, or Firm* — Marc A. Hubbard; Gardere Wynne Sewell LLP

(57) ABSTRACT

The gripping element of a coiled tubing injector has a carrier and a removable gripping shoe mounted to the carrier. The removable shoe slides onto slots formed on the carrier and is floated on the carrier by inserting an elastomeric pad sandwiched between the carrier and shoe. A manually depressible spring along ones side of the carrier prevents the shoe from sliding out of the slots during operation of the injector.

24 Claims, 7 Drawing Sheets

U.S. PATENT DOCUMENTS

| | | | | |
|---|---|---|---|---|
| 3,824,875 | A | | 7/1974 | Willert et al. |
| 3,827,487 | A | | 8/1974 | Jackson et al. |
| 3,841,407 | A | | 10/1974 | Bozeman |
| 3,866,882 | A | | 2/1975 | Willm et al. |
| 3,920,076 | A | | 11/1975 | Laky |
| 3,945,547 | A | * | 3/1976 | Ledebur ..... 226/172 |
| 4,013,205 | A | * | 3/1977 | Fabre-Curtat et al. ..... 226/173 |
| 4,147,215 | A | | 4/1979 | Hodge et al. |
| 4,172,391 | A | | 10/1979 | Dressel |
| 4,251,176 | A | | 2/1981 | Sizer et al. |
| 4,290,495 | A | | 9/1981 | Elliston |
| 4,336,840 | A | | 6/1982 | Bailey |
| 4,421,175 | A | | 12/1983 | Boyadjieff et al. |
| 4,440,220 | A | | 4/1984 | McArthur |
| 4,479,547 | A | | 10/1984 | Boyadjieff et al. |
| 4,515,220 | A | | 5/1985 | Sizer et al. |
| 4,585,061 | A | | 4/1986 | Lyons, Jr. et al. |
| 4,655,291 | A | | 4/1987 | Cox |
| 4,899,620 | A | | 2/1990 | Schiffer |
| 5,002,130 | A | | 3/1991 | Laky |
| 5,029,642 | A | | 7/1991 | Crawford |
| 5,094,340 | A | | 3/1992 | Avakov |
| 5,133,405 | A | | 7/1992 | Elliston |
| 5,188,174 | A | | 2/1993 | Anderson, Jr. et al. |
| 5,234,053 | A | | 8/1993 | Connell |
| 5,309,990 | A | | 5/1994 | Lance |
| 5,454,419 | A | | 10/1995 | Vloedman |
| 5,484,222 | A | * | 1/1996 | Schulze-Beckinghausen ..... 403/307 |
| 5,533,658 | A | | 7/1996 | Benedict et al. |
| 5,553,668 | A | | 9/1996 | Council et al. |
| 5,566,764 | A | | 10/1996 | Elliston |
| 5,671,811 | A | | 9/1997 | Head |
| 5,765,643 | A | | 6/1998 | Shaaban et al. |
| 5,836,385 | A | | 11/1998 | Koopmans |
| 5,839,514 | A | | 11/1998 | Gipson |
| 5,845,708 | A | | 12/1998 | Burge et al. |
| 5,865,392 | A | | 2/1999 | Blount et al. |
| 5,875,850 | A | | 3/1999 | Burge et al. |
| 5,890,534 | A | | 4/1999 | Burge et al. |
| 5,918,671 | A | | 7/1999 | Bridges et al. |
| 5,937,943 | A | | 8/1999 | Butler |
| 5,944,099 | A | | 8/1999 | Sas-Jaworsky |
| 5,975,203 | A | | 11/1999 | Payne et al. |
| 6,059,029 | A | | 5/2000 | Goode |
| 6,135,202 | A | | 10/2000 | Koshak |
| 2002/0125014 | A1 | | 9/2002 | Dearing et al. |
| 2003/0079883 | A1 | | 5/2003 | McCulloch et al. |

FOREIGN PATENT DOCUMENTS

| | | | |
|---|---|---|---|
| CA | 1056808 | | 6/1979 |
| CA | 1096850 | | 3/1981 |
| CA | 2351648 | | 2/2002 |
| EP | 0 507 280 | A1 | 10/1992 |
| EP | 0 524 648 | A2 | 1/1993 |
| EP | 0 791 719 | A1 | 8/1997 |
| GB | 2029478 | | 8/1978 |
| GB | 2029478 | A | 3/1980 |
| GB | 2 247 260 | A | 2/1992 |
| GB | 2 325 948 | A | 12/1998 |
| WO | WO 86/01561 | | 3/1986 |
| WO | WO 96/28633 | | 9/1996 |
| WO | WO 97/40255 | | 10/1997 |

OTHER PUBLICATIONS

Examination Report Under Section 18(3); Application No. GB 9809416.2; U.K. Patent Office, Feb. 1, 2011, 1 pg.

Response to U.K. Patent Office to Official Letter of Feb. 1, 2001; Application No. GB 9809416.2; Aug. 1, 2001; 11 pgs.

* cited by examiner

UNIVERSAL CARRIER FOR GRIPPERS IN A COILED TUBING INJECTOR

Matter enclosed in heavy brackets [ ] appears in the original patent but forms no part of this reissue specification; matter printed in italics indicates the additions made by reissue.

This application claims the benefit of U.S. provisional application no. 60/045,365, filed May 2, 1997, which application is incorporated herein by reference.

FIELD OF THE INVENTION

The invention relates generally to coiled tubing injectors for handling a continuous length of tubing or pipe for insertion into or removal from a well bore, and for drilling well bores. More particularly, it concerns gripping elements used by such injectors.

BACKGROUND OF THE INVENTION

Continuous, reeled pipe is generally known within the industry as coiled tubing and has been used for many years. It is much faster to run into and out of a well bore than conventional jointed, straight pipe.

Coiled tubing is run into and out of well bores using what are known in the industry as coiled tubing injectors. The name derives from the fact that, in preexisting well bores, the tubing must be literally forced or "injected" into the well through a sliding seal to overcome the well pressure until the weight of the tubing exceeds the force produced by the pressure acting against the cross-sectional area of the tubing. However, once the weight of the tubing overcomes the pressure, it must be supported by the injector. The process is reversed as the tubing is removed from the well.

The only method by which a continuous length of tubing can be either forced against pressure into the well, or supported while hanging in the well bore or being lowered or raised is by continuously gripping a length of the tubing just before it enters the well bore. This is achieved by arranging continuous chain loops on opposite sides of the tubing. The continuous chains carry a series of grippers which are pressed against opposite sides of the tubing and grip the tubing.

Coiled tubing has traditionally been used primarily for circulating fluids into the well and other work over operations, rather than drilling, because of its relatively small diameter and because it was not strong enough, especially for deep drilling. However, in recent years, coiled tubing has been increasingly used to drill well bores. For drilling, a turbine motor suspended at the end of the tubing and is driven by mud or drilling fluid pumped down the tubing. Coiled tubing has also been used as permanent tubing in production wells. These new uses of coiled tubing have been made possible by larger, stronger coiled tubing.

SUMMARY OF THE INVENTION

A coiled tubing injector according to the present invention includes a quick-release carrier for mounting gripping shoes to chains of the injector. The carrier enables removal and replacement of grippers in the field without tools, even when the injector is operating. An injector thus may be quickly adapted to run coiled tubing within a wide range of diameters, for purposes of a well work over to drilling. Furthermore, an injector having grippers according to the present invention may be used to run conventional jointed, straight pipe, or a tool string on the end of coiled tubing. The diameter of joints are larger than the diameter of the pipe. Tool strings have various diameters. The quick-release carrier enables gripping shoes to be easily removed to accommodate a joint or a tool as it passes through the injector during operations. Gripping shoes can be easily replaced with gripping shoes that have the appropriate size and shape for gripping the tool. All shoes are sized so that, when attached to the injector, they have same centerline or axis as the other shoes. Thus, gripping shoes of differing sizes can be used on the injector to grip a downhole tool or irregularly sized object in the pipe string as it is passing through the injector.

These and other aspects and advantages of the invention are discussed below in connection with a preferred embodiment illustrated by the appended drawings.

DESCRIPTION

In the following description, like numbers refer to like elements.

Figure 1:
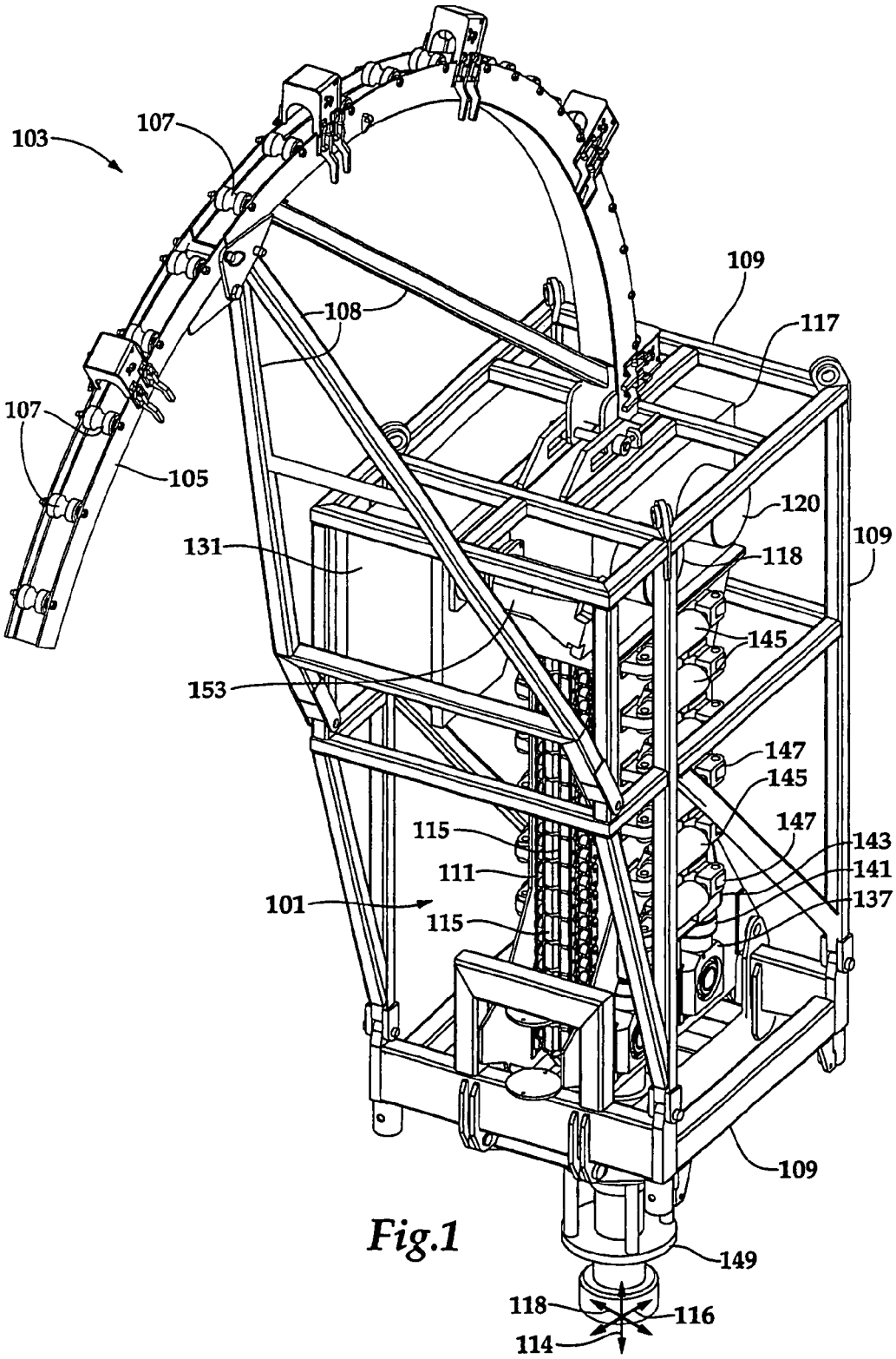
FIG. 1 is an isometric view of a coiled tubing injector intended to be representative of coiled tubing injectors generally, but with grippers according to the present invention.
Figure 2:
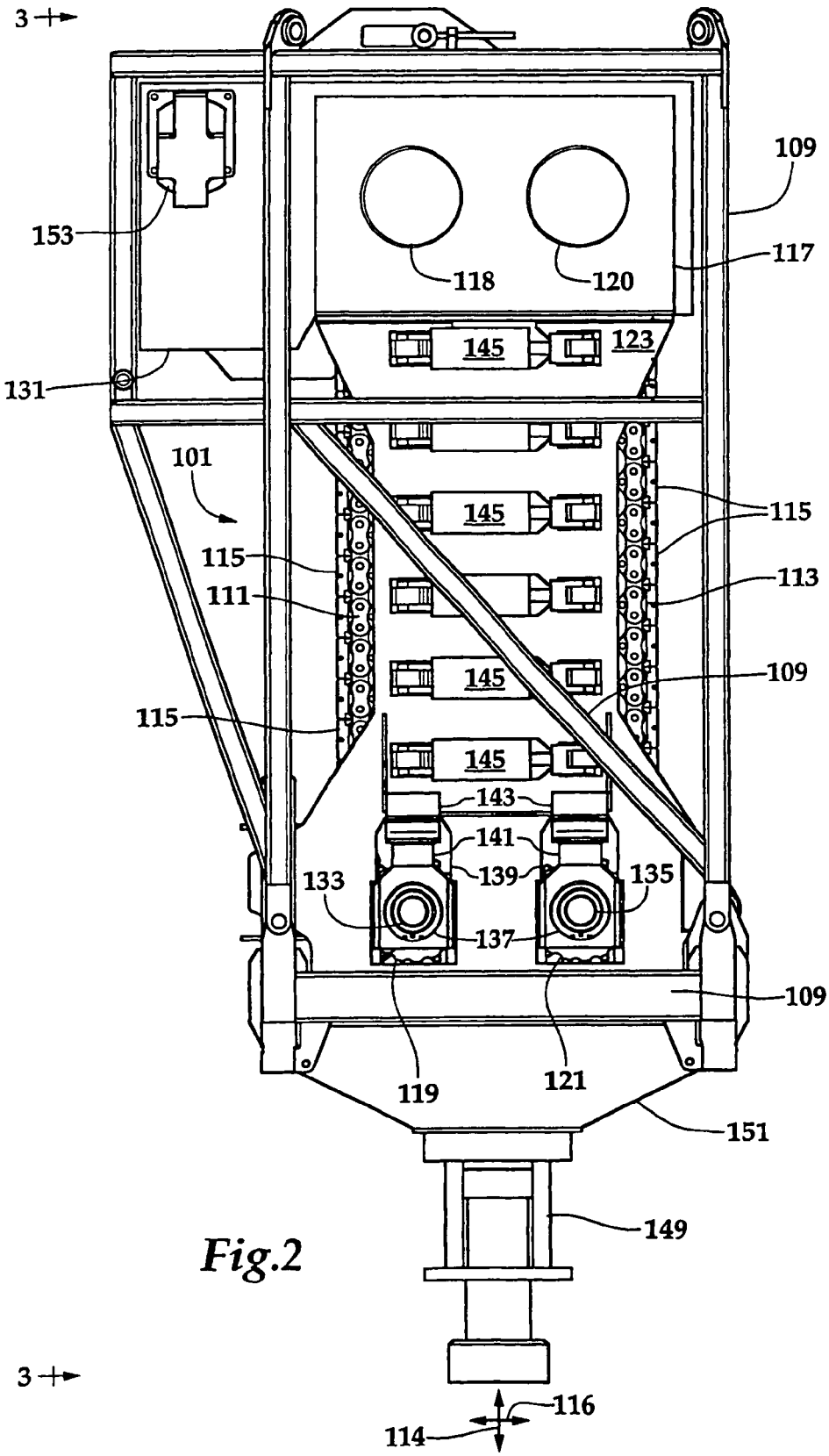
FIG. 2 is a front elevational view of the coiled tubing injector shown in FIG. 1.
Figure 3:
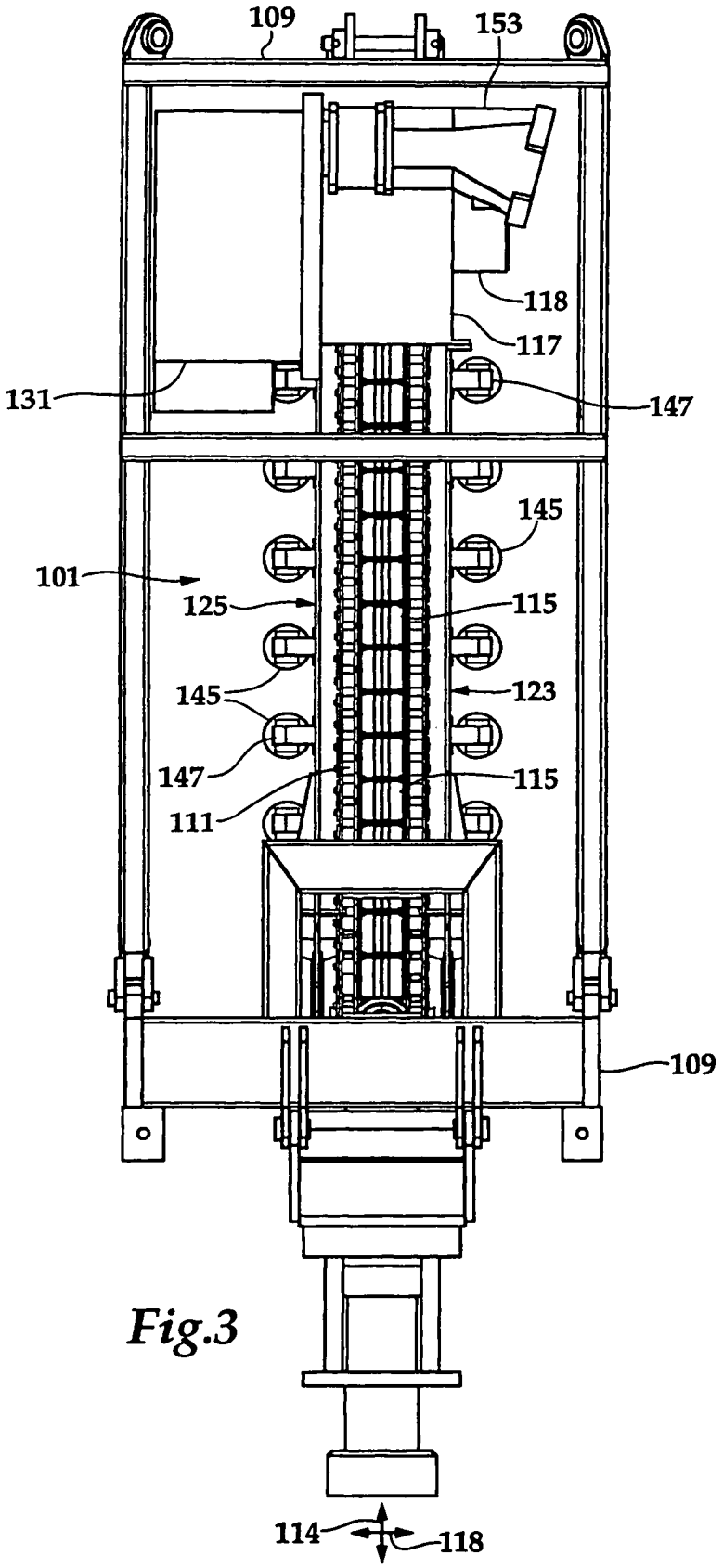
FIG. 3 is a left side elevational view of the coiled tubing injector shown in FIGS. 1 and 2.
Figure 4:
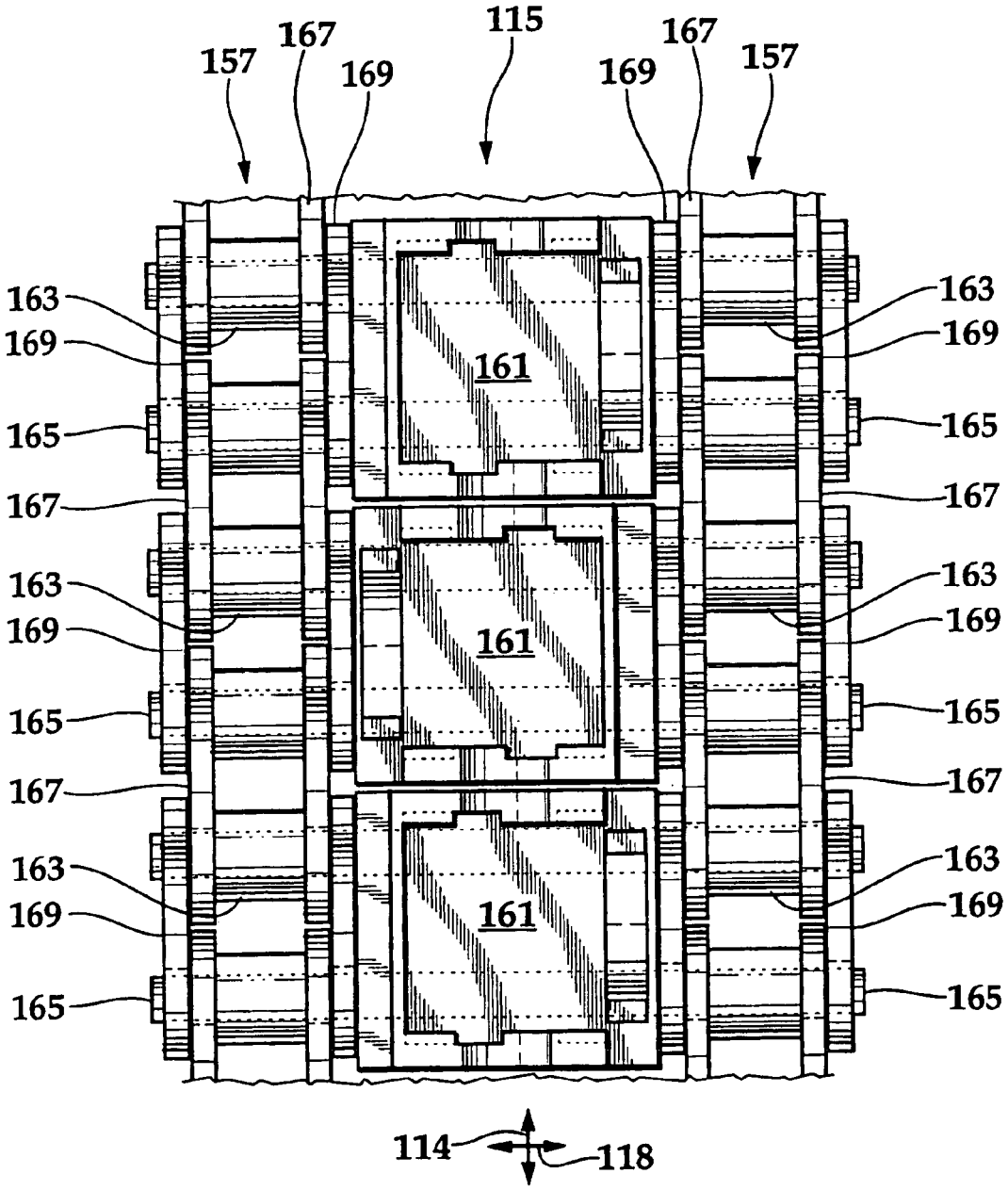
FIG. 4 is an plan view of a drive chain of a coiled tubing injector having gripper carriers according to the present invention.

FIGS. 1, 2 and 3 illustrate an example of a coiled tubing injector 101. It is intended to be representative of coiled tubing injectors generally for purposes of describing the invention, even though it may differ from other prior art coiled tubing injectors in several important aspects.

Referring first to FIG. 1, coiled tubing is transported into the top of coiled tubing injector 101 from a reel (not shown) on a "goose-neck" support 103. The goose-neck support includes a frame 105 supporting a plurality of rollers 107. Bracing 108 extending from cage 109 positions the goose-neck support 103 in proper relation to the injector 101. The cage also supports the injector 101 for transportation. Legs (not shown) may also be attached to the corners of the bottom of the cage 101 to stand the injector above a well head (not shown).

Referring now to FIGS. 1, 2 and 3 together, injector 101 includes two, continuous loop drive chains generally designated by reference numbers 111 and 113. The drive chains revolve generally within a common plane defined by axes 114 and 116, which plane is normal to axis 118. Connected to each drive chain is a plurality of grippers 115. The drive chains 111 and 113 are arranged in a conventional, opposing relationship. Each drive chain 111 and 113 is mounted on an upper drive sprocket (not shown) and a lower drive sprocket 119 and 121, respectively. The upper drive sprockets are mounted within drive housing 117 and are not visible in these views. One set of bearings for the shafts of upper drive sprockets are mounted within bearing housings 118 and 120, respectively. The other set of bearings on which the shafts of upper drive sprockets are journalled are mounted to the opposite side of the drive housing 117.

A box-shaped frame is formed from two, parallel front plates 123 and 125, separated by side plate 127 and a second side plate parallel to side plate 127 but not visible in these views. This frame supports the drive housing 117 and transmission gear box 131 at its upper end, and the lower drive sprockets at its lower end.

The lower drive sprockets 119 and 121 are connected to shafts 133 and 135, respectively. The ends of each shaft is journalled on opposite sides of the injector frame within a movable carrier 137. Each carrier is mounted so that it may slide vertically within an elongated slot 139 defined in either the front plate 123 or rear plate 125. A hydraulic cylinder 141 is inserted between the top of each carrier 137 and a block 143 connected to the frame at the top of each elongated slot 139. Each cylinder 141 applies a spreading force between the stationary block and the moving carrier 137 to push down on the lower drive sprockets 119 and 121 and thus tension the drive chains.

Although not visible, coiled tubing injector 101 includes two skates, one for each drive chain, for forcing the grippers 115 toward each other as they enter the area between the two drive chains through which the coiled tubing passes. Examples of such skates are shown in U.S. Pat. No. 5,309,990 and are well known in the art. A plurality of hydraulic cylinders 145 are used to pull together the skates and maintain uniform gripping pressure against coiled tubing (not shown) along the length of the skates. Each cylinder 145 is connected at each end through a clevis and pin to an eyelet 147 of a bar extending behind one of the skate and terminating in another eyelet connected to another piston on the opposite side of the injector.

At the bottom of the injector, a stripper 149 carried by a stripper adapter 151, connects the injector to a well head. Power for driving the injector is provided by a high speed, low torque hydraulic motor 153 coupled with the transmission gear box 131 through brake 155. The hydraulic motor is supplied with a pressurized hydraulic fluid in a conventional manner.

Referring now to FIGS. 4-7, drive chain 111 includes a roller chain having two strands, 157 and 159, on either side of the row of grippers 115. (Note that in FIG. 4, the grippers have their shoes removed, revealing gripper carriers 161.) The roller chain is of well-known construction. Rollers 163 are mounted on pins 165 which extend from an exterior side of strand 157, through gripper carrier 161, to the exterior side of strand 159. Roller links 167 are disposed on opposite sides of each pair of rollers 163. Pin link plates 169 are outboard of each roller plate and connect pairs of pins.

Mounted to an underside of gripper carriers 161 are a pair of roller bearings 171 and 173 which ride upon the skates of the injector. The roller bearings are rotatably mounted on pin 175.

Figure 5:
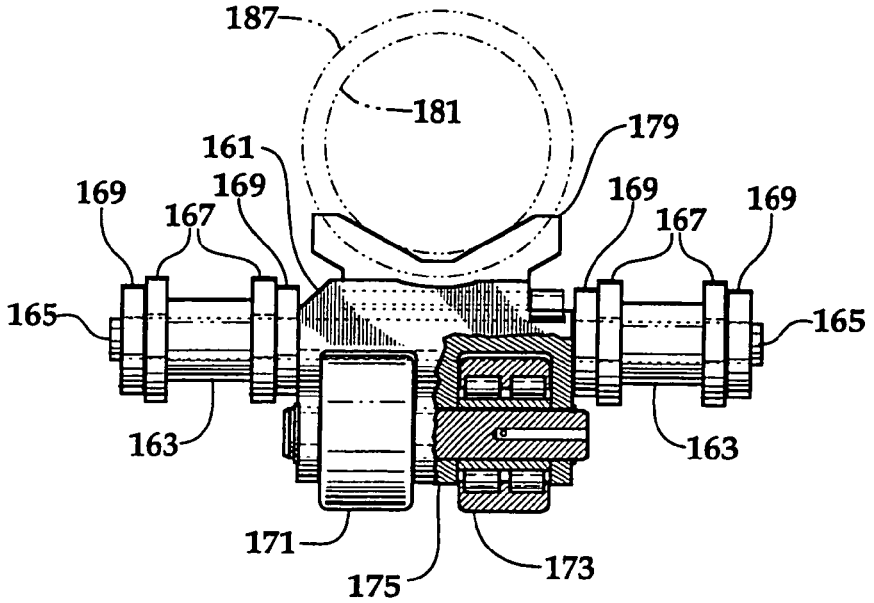
FIG. 5 is a side, elevational view, partially sectioned, of a gripper with a first shoe type mounted on one of the gripper carriers on the drive chain of FIG. 4.
Figure 6:
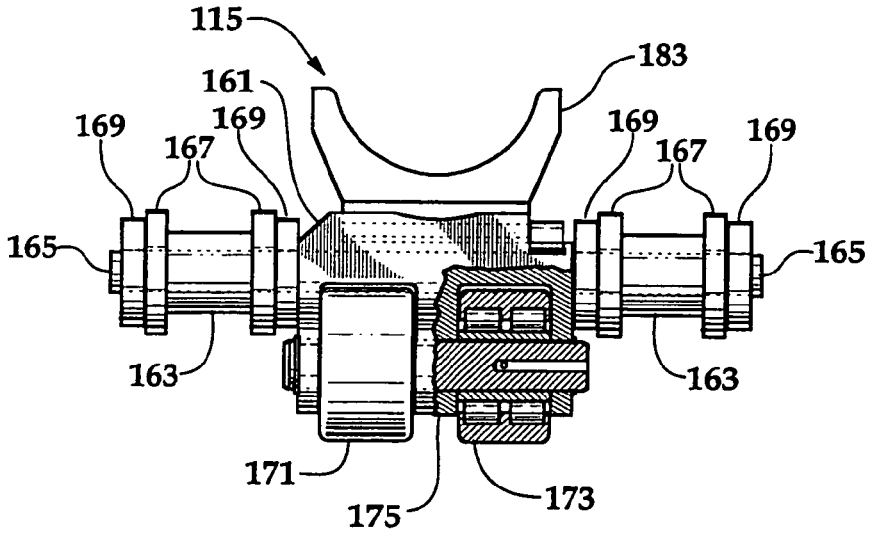
FIG. 6 is a side, elevational view, partially sectioned, of a gripper with a second shoe type mounted on one of the gripper carriers on the drive chain of FIG. 4.
Figure 7:
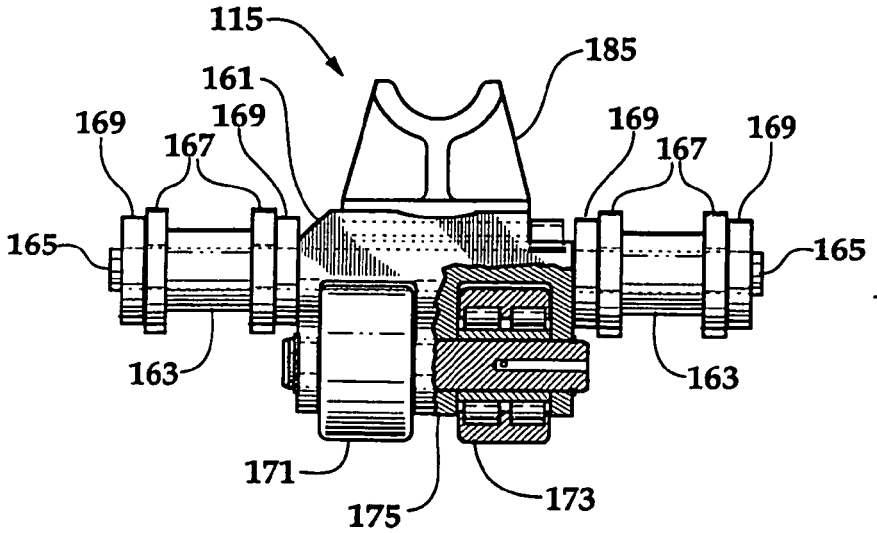
FIG. 7 is a side, elevational view, partially sectioned, of a gripper with a third shoe type mounted on one of the gripper carriers on the drive chain of FIG. 4.
Figure 8:
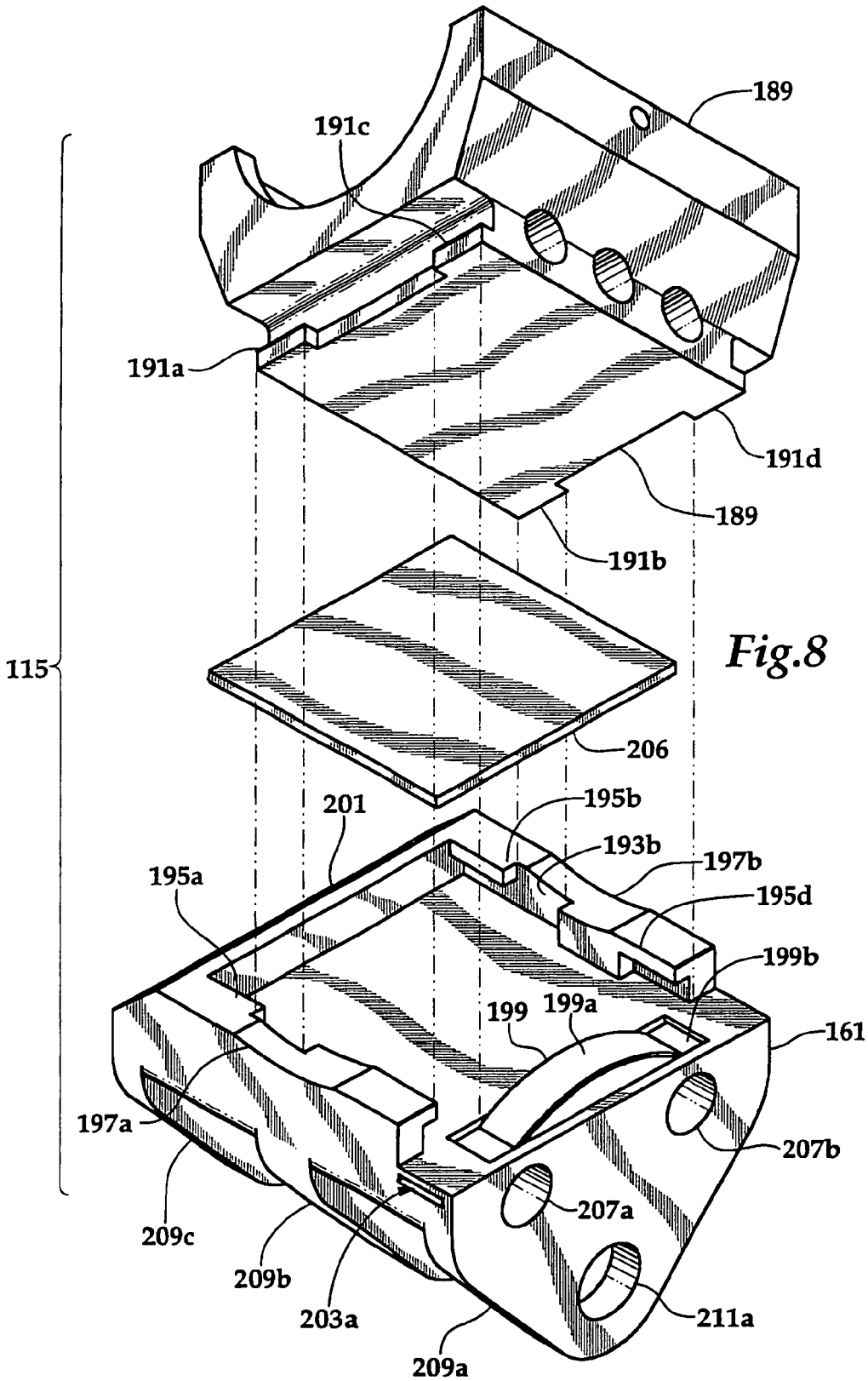
FIG. 8 is a perspective view of the gripper carrier and the gripper shoe of FIG. 6 before as one is being mounted to the other.
Figure 10:
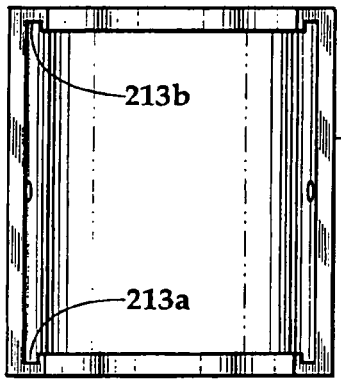
FIG. 10 is a top, plan view of the gripper shoe of FIG. 6.

As illustrated by FIGS. 5, 6 and 7, a plurality of different shoes may be attached to the same gripper carrier 161. For example, in FIG. 5, "V"-shaped gripper shoe 179 can support large diameter tubing or pipe, the outer diameter of which is indicated in phantom by dashed circle 181. In FIG. 6, it is round-shaped gripper shoe adaptor 183 which may hold various sizes of rounded gripper shoes disposed therein (not shown) for gripping smaller diameter pipes and tubing. In FIG. 7, a comparatively small gripper shoe 185 is shown mounted to gripper carrier 161. When installed in an injector, the position of the center line of the pipe to be gripped by gripper shoe 185 will be the same as the center line of the larger diameter pipe to be gripped by gripper shoe 179. This allows different shoes to be installed on the same injector in order to accommodate gripping of irregularly shaped tools or joints being passed through the injector without changing the relative position of the skates on which the gripper carriers roll.

Each of the gripper shoes may be quickly inserted and removed from the gripper carrier 161 without the use of tools. This is especially useful when running conventional, jointed pipe rather than coiled tubing, or when running a tool string corrected to one end of the coiled tubing. One or more gripper shoes are removed from each drive chain to pass the pipe joint or tool. In FIG. 5, for example, the diameter of a joint is illustrated by dashed circle 187 and the outer diameter of the pipe by dashed circle 181.

Figure 9:
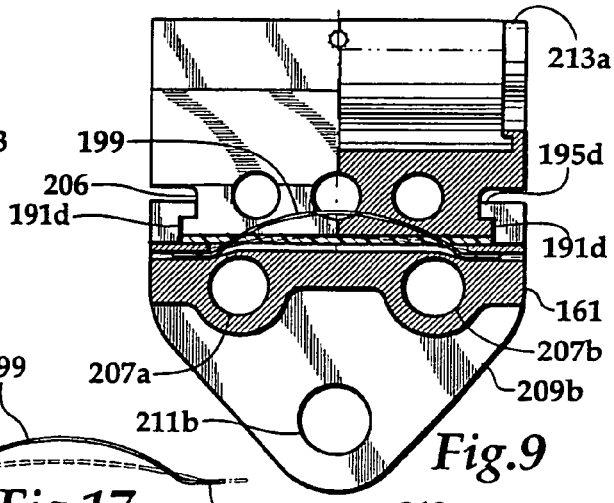
FIG. 9 is a side, elevational view of the gripper shoe mounted on the gripper carrier of FIG. 8.
Figure 17:
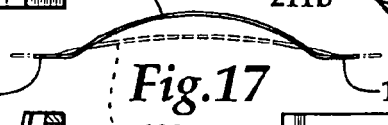
FIG. 17 illustrates flexing of a leaf spring of the gripper carrier.
Figure 11:
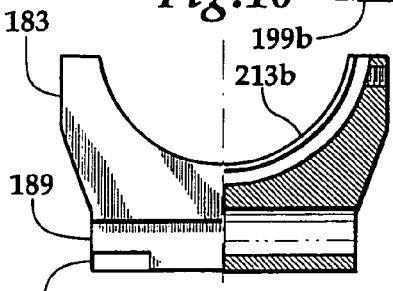
FIG. 11 is a partially sectioned, end view of the gripper shoe of FIG. 10.
Figure 12:
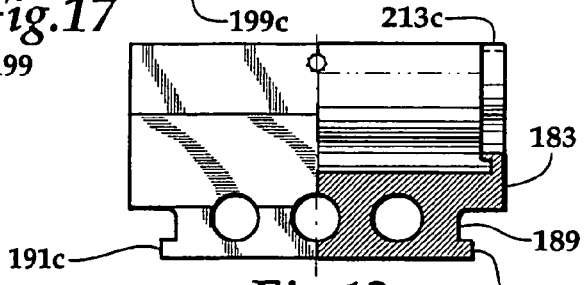
FIG. 12 is a partially sectioned, side view of the gripper shoe of FIG. 10.
Figure 13:
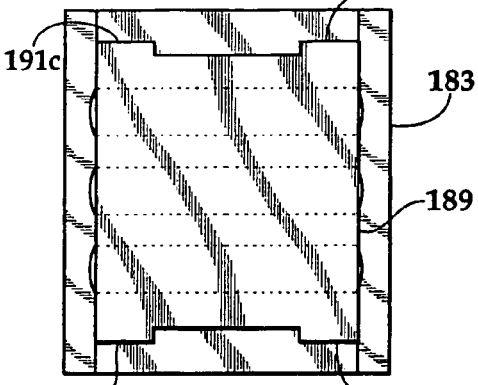
FIG. 13 is a bottom, plan view of the gripper shoe of FIG. 10.
Figure 14:
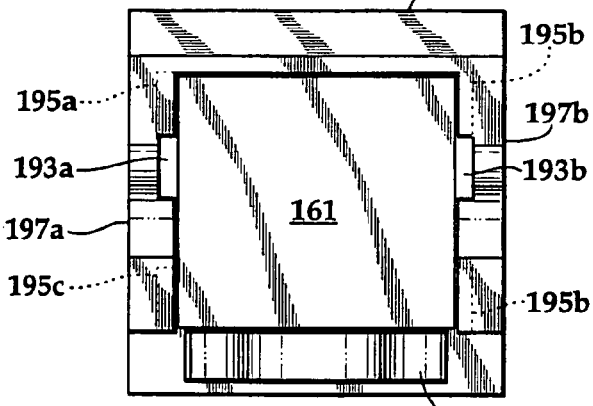
FIG. 14, is a top, plan view of the gripper carrier shown in FIGS. 4-9.
Figure 15:
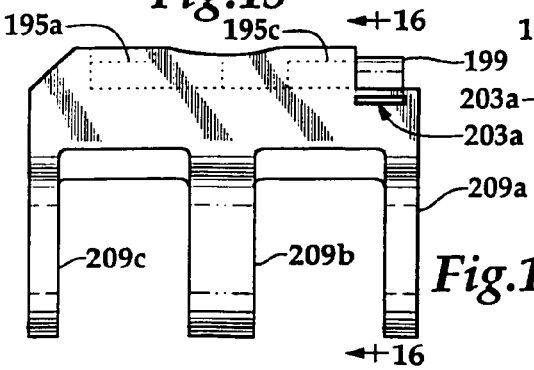
FIG. 15 is a side view of the gripper carrier of FIG. 14.
Figure 16:
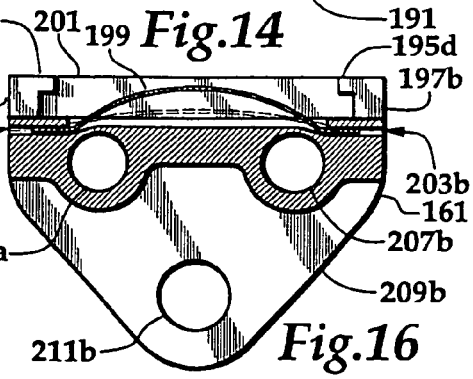
FIG. 16 is a cross-section of the gripper carrier taken along section line 16-16 in FIG. 15.

Referring now to FIGS. 8-17, to mount a gripper shoe to the carrier 161, a universal base 189 is integrally formed on the bottom of the gripper shoe. The base mounts to the gripper shoe carrier using a tongue and groove type of mounting that allows the gripper shoe to be slid onto and out of the mounting in directions that, when the injector is in an operational position, are generally parallel to the ground, which directions are generally oriented along axis 118, and perpendicular to the directions in which the chain moves, which directions are generally oriented along axis 114. Thus, forces exerted by the pipe string on the gripping elements, which forces are primarily along axis 114, tend to act in a direction along axis 114. along which the grippers shoe is slid into and out of the gripper shoe carriers. For purposes of explanation only, the gripper shoe adaptor 183 is chosen to illustrate this base. The same base is found on each of the gripper shoes 179 and 185. The universal base 189 includes four mounting lugs, 191a, 191b, 191c and 191d which function as tongues that slide into grooves in the form of slots defined by ledges 195 and rails 197 around the periphery of the carrier. When the gripper shoe is lowered toward the carrier, lug 191a fits into slot 193a defined between ledges 195a and 195c extending from left side rail 197a. Lug 191b fits in slot 193b defined between ledges 195b and 195c extending from right side rail 197b. Lugs 191c and 191d fit over the end of the side rails 197a and 197b, respectively. The base of the gripper shoe presses against a flat, metal leaf spring 199, forcing it down to allow the gripper shoe base 189 to be slid into the base, toward end rail 201. When base is pushed back to the end rail, the lugs 191a-191d pass under ledges 195a-195d, respectively and cooperate with the ledges to retain the gripper shoe on the carrier. Leaf spring 199 then pops up, as best shown in FIG. 9, and retain the gripper show on the carrier. During normal operation of the injector, lateral forces which would push the gripping shoe against the leaf spring are not substantial. Nevertheless, the leaf spring does possess substantial lateral strength. To reduce the effect of forces acting as the gripper shoes in lateral direction, the orientation of the carriers may be alternated on the chain, thus preventing the springs from carrying the lateral load.

The flat, metal leaf spring 199 is formed of an arched body section 199a and feet 199b and 199c. The feet of the spring are trapped within open-ended slots 203a and 203b formed in the carrier 161. Depressing the leaf spring flattens it and causes the feet to slide outward, as illustrated in phantom by FIG. 17. When the feet slide outward, any dirt or other debris which may have accumulated in the slots 203a and 203b is pushed out through their open ends. The spring force of the spring is such that it may easily be manually depressed to release the gripper shoe, or pulled to remove the spring to clean a shallow channel 205 formed in the carrier between the open slots 203a and 203b for accommodating the body of the leaf when it is depressed.

Sandwiched between the gripper shoe base 189 and the carrier 161 is an elastomeric pad 206 of high spring rate which allows the gripper shoe to float on the carrier 161. Slightly floating the gripper shoe allows the gripper shoe to automatically make small adjustments in its alignment with the coil tubing or pipe as it engages the tubing or pipe, thus providing a more even distribution of gripping forces across the shoe. The elastomeric pad also accommodates manufacturing tolerances that result in slight variations in the distances between the skate on which the roller bearings of the gripper carriers ride and the centerline of the pipe or other object being gripped. Thus, more of the gripping shoes will make good gripping contact with the pipe, improving overall grip. Preferably, only gripping shoes are used that have fixed shapes conforming to the normal shape of the pipe, and that surround substantially half of the circumference of the pipe. The fixed shape shoes cause the pipe to maintain its normal shape as strong forces are applied to the pipe, thus preventing deformation. By forcing the pipe to retain its normal shape and floating the gripper shoe for better alignment of the shoe with the pipe, contact area between the gripping shoe and pipe is increased. Furthermore, greater force may be applied to the pipe without concern of deformation. Thus, with greater contact area and force, gripping is improved.

Each shoe carrier 161 is mounted to one of the two drive chains by inserting one of the chain pins 165 (FIG. 5) through each of the bores 207a and 207b. Rollers 171 and 173 (FIGS. 5-7) are mounted between flanges 209a, 209b and 209c. Roller 175 extends though openings 211a and 211b in flanges 209a and 209b, and in a similar opening in flange 209c which is not visible in these views.

Gripping shoe adaptor 183 includes rims 213a and 213b located at opposite ends for retaining removable gripping elements (not shown). Gripping elements may thus be replaced when worn or changed in size or shape, or to accommodate passing of downhole tools or other downhole assemblies having different diameters than the pipe.

The forgoing embodiments are but examples of the invention. Modifications, omissions, substitutions and rearrangements may be made to the forgoing embodiments without departing from the invention as set forth in the appended claims.

What is claimed is:

1. A tube conveying apparatus comprising:

a frame;

a pair of continuous drive chains supported on the frame and revolving in a [commom] *common* plane, the pair of drive chains having opposed, elongated parallel runs spaced apart to form a path for engaging tubing passing therebetween; and a plurality of grippers carried on each of the pair of drive chains;

wherein, each gripper includes a carrier mounted to the chain and a pipe gripping shoe mounted to the carrier, the shoe including a plurality of tongues for sliding, in directions generally perpendicular to the common plane, in corresponding grooves formed by the carrier for retaining the shoe on the carrier, *the tongues and grooves being arranged for enabling dismounting the shoe in a sliding motion in a direction generally perpendicular to the common plane*.

2. The apparatus of claim 1 wherein the carrier includes a releasable retaining member for preventing the shoe from sliding out of the carrier along one of the directions perpendicular to the common plane.

3. The apparatus of claim 1 further including a depressible spring extending from the carrier in a direction parallel with the common plane for blocking sliding of the shoe out of the carrier along one of the directions perpendicular to the common plane, wherein depressing the spring allows sufficient clearance between the spring and the shoe to allow the shoe to slide out of carrier.

4. The apparatus of claim 1 further wherein, in each gripper, the carrier includes a leaf spring having an arched portion between two end portions, each end portion extending into one of two slots formed in the carrier, the arched portion extending in a direction parallel with the common plane for blocking sliding of the shoe out of the carrier along one of the directions perpendicular to the common plane; whereby manually depressing the arched portion toward the carrier causes each of the two end portions of the spring to slide further into the slots and flattens the arched portion of the spring, resulting in sufficient clearance between the arched portion of the leaf spring and the shoe to allow the shoe to slide out of the carrier.

5. The apparatus of claim 4 wherein each of the slots have an opening opposite where the end of the leaf springs enter, whereby debris which may accumulate in each of the slots is forced out of the slots by depressing the leaf spring.

6. The apparatus of claim 4 wherein, in each gripper, the carrier has an outer periphery, and the grooves are formed by ledges extending along opposites sides of the outer periphery of the carrier; and the leaf spring is disposed along the periphery of the carrier, between the ledges.

7. The apparatus of claim 6 wherein, in each gripper, the tongues on each shoe include four lugs; and the ledges extending along opposite sides of the outer periphery of the carrier have openings through which an opposing pair of lugs may pass as the shoe is lowered toward the carrier during mounting, while the other lugs pass by to the side the ledges.

8. The apparatus of claim 1 wherein the carrier further includes a fixed rail for retaining sliding movement of a shoe in one of the directions perpendicular to the common plane, and a releasable retaining member for preventing the shoe from sliding out of the carrier along the other of the directions perpendicular to the common plane.

9. The apparatus of claim 1 further including an elastomeric pad positioned between the shoe and the carrier.

10. A tubing gripper comprising:

a carrier having front and back sides, means for mounting the back side of the carrier to a chain, two opposing slots formed on the front side of the carrier, each of the slots having an open end and closed end; and a pipe gripping shoe removably mounted to the carrier, the shoe including a base portion having lugs for sliding *along a first axis* into the open ends of the slots, the slots and lugs thereby cooperating to retain the shoe on the carrier *in all directions except along the first axis*.

11. The gripper of claim 10 further comprising manually-depressible means for blocking, in an extended position, movement of the lugs out of the open ends of the slots, and for allowing movement, when in a depressed position, of the lugs out of the open ends of the slots of the carrier.

12. The gripper of claim 11 wherein the means for blocking movement includes a spring.

13. The gripper of claim 12 wherein the spring is a leaf spring having an arched portion between two ends inserted into slits in the carrier, the arched portion extending in a plane generally perpendicular to the axis for blocking sliding of the shoe out of the carrier along one of the directions parallel to the axis; whereby, manually depressing the arched portion toward the carrier causes each of the two ends of the spring to slide further into the slits and flattens the arched portion of the spring, resulting in sufficient clearance between the arched portion of the leaf spring and the shoe to allow the shoe to slide out of the carrier.

14. The gripper of claim 11 wherein the means for blocking movement [incudes] *includes* a leaf spring having an arched portion between two ends inserted into slits formed in the carrier, the arched portion extending in a plane generally perpendicular to the pivot axis of the carrier for blocking sliding of the shoe out of the carrier along one of the directions parallel to the axis; whereby manually depressing the arched portion toward the carrier causes each of the two ends of the spring to slide further into the slits and flattens the arched portion of the spring, resulting in sufficient clearance between the arched portion of the leaf spring and the shoe to allow the shoe to slide out of the carrier.

15. The gripper of claim 10 wherein the carrier has an outer periphery, and wherein the slots are defined by ledges located along opposites sides of the side edges.

16. The gripper of claim 10 further comprising an elastomeric pad positioned between the shoe and the carrier.

17. The gripper of claim 10 further comprising a releasable retaining member for blocking movement of the lugs out of the open ends of the slots.

18. A tube conveying apparatus comprising:

a frame;

a pair of continuous drive chains supported on the frame and revolving in a common plane, the pair of drive chains having opposed, elongated parallel runs spaced apart to form a path for engaging tubing passing therebetween; and a plurality of grippers carried on each of the [first and second] *pair of continuous* drive chains;

wherein, each gripper includes, a carrier mounted to the chain, a pipe gripping shoe retained on the carrier, the pipe gripping shoe having a gripping portion having a rigid shape that fits around substantially one-half of an outer circumference of tubing to be injected, and an elastomeric pad positioned between the carrier and shoe for floating the shoe on the carrier;

wherein, the carrier has two opposing slots, each of the slots having an open end and closed end; and the pipe gripping shoe has lugs for sliding into the open ends of the slots, the slots and lugs thereby cooperating to retain the shoe on the carrier.

19. A tube conveying apparatus comprising:

a frame;

a pair of continuous drive chains supported on the frame and revolving in a common plane, the pair of drive chains having opposed, elongated parallel runs spaced apart to form a path for engaging tubing passing therebetween; and a plurality of grippers carried on each of the pair of drive chains;

wherein, each gripper includes a carrier mounted to the chain and a gripping shoe connected to the carrier by means of tongues that slide into corresponding grooves in directions generally perpendicular to the common plane for retaining the shoe on the carrier, *the tongues and grooves being arranged to retain the gripping shoe on the carrier in all directions but the directions generally perpendicular to the common plane*.

20. The apparatus of claim 19 wherein the carrier includes a retaining member for preventing the shoe from sliding out of the carrier alone one of the directions perpendicular to the common plane.

21. The apparatus of claim 19 further including a depressible spring extending from the carrier in a direction parallel with the common plane for blocking sliding of the shoe out of the carrier along one of the directions perpendicular to the common plane, wherein depressing the spring allows sufficient clearance between the spring and the shoe to allow the shoe to slide out of carrier.

22. The apparatus of claim 19 further wherein each gripper includes a leaf spring having an arched portion between two end portions, each end portion extending into one of two slots formed in the carrier, the arched portion extending in a direction parallel with the common plane for blocking sliding of the shoe out of the carrier along one of the directions perpendicular to the common plane; whereby manually depressing the arched portion toward the carrier causes each of the two ends of the spring to slide further into the slots and flattens the arched portion of the spring, resulting in sufficient clearance between the arched portion of the leaf spring and the shoe to allow the shoe to slide out of the carrier.

23. The apparatus of claim 22 wherein each of the slots have an opening opposite where the end Of the leaf springs enter, whereby debris which may accumulate in each of the slots is forced out of the slots by depressing the leaf spring.

24. The apparatus of claim 19 further including an elastomeric pad positioned between the shoe and the carrier.

* * * * *

UNITED STATES PATENT AND TRADEMARK OFFICE

CERTIFICATE OF CORRECTION

PATENT NO. : RE43,410 E
APPLICATION NO. : 10/345836
DATED : May 29, 2012
INVENTOR(S) : John E. Goode It is certified that error appears in the above-identified patent and that said Letters Patent is hereby corrected as shown below:

At column 4, line number 37, please replace [corrected] with -- connected --.

In the Claims:

At column 8, claim number 23, line number 56, please replace [Of] with -- of --.

Signed and Sealed this
Seventh Day of August, 2012

David J. Kappos

David J. Kappos
*Director of the United States Patent and Trademark Office*